(12) United States Patent
Janssen

(10) Patent No.: US 11,305,889 B2
(45) Date of Patent: Apr. 19, 2022

(54) SYSTEM, METHOD AND SOFTWARE BASED MEDIUM FOR PROVIDING A SAFE AND SECURE DELIVERY PLATFORM FOR A DRONE INCLUDING REAL TIME DATA COMMUNICATION INCORPORATING ANY OF VIDEO, RFID AND PROCESS STEP NOTIFICATION

(71) Applicant: Brian Janssen, Brookfield, WI (US)

(72) Inventor: Brian Janssen, Brookfield, WI (US)

( * ) Notice: Subject to any disclaimer, the term of this patent is extended or adjusted under 35 U.S.C. 154(b) by 226 days.

(21) Appl. No.: 16/859,229

(22) Filed: Apr. 27, 2020

(65) Prior Publication Data

US 2020/0255163 A1    Aug. 13, 2020

Related U.S. Application Data

(63) Continuation of application No. 16/053,335, filed on Aug. 2, 2018, now Pat. No. 10,661,916.
(Continued)

(51) Int. Cl.
| | |
|---|---|
| *B66F 7/00* | (2006.01) |
| *B64F 1/32* | (2006.01) |
| *A47G 29/14* | (2006.01) |
| *A47G 29/124* | (2006.01) |
| *G06Q 10/08* | (2012.01) |
| *G05D 1/00* | (2006.01) |

(Continued)

(52) U.S. Cl.
CPC .............. *B64F 1/32* (2013.01); *A47G 29/124* (2013.01); *A47G 29/141* (2013.01); *G05D 1/00* (2013.01); *G06Q 10/0832* (2013.01); *A47G 2029/1226* (2013.01); *A47G 2029/142* (2013.01); *A47G 2029/145* (2013.01); *A47G 2029/147* (2013.01); *A47G 2200/226* (2013.01); *B64C 2201/128* (2013.01); *B66F 3/28* (2013.01)

(58) Field of Classification Search
CPC ...... B66F 1/00; B66F 3/08; B66F 3/24; B66F 5/00; B66F 7/00; B66F 9/00; B66F 11/00; G05D 1/00; G05D 10/0832
See application file for complete search history.

(56) References Cited

U.S. PATENT DOCUMENTS

| | | |
|---|---|---|
| 3,747,896 A | 7/1973 | Botzum |
| 5,992,250 A | 11/1999 | Kluth et al. |

(Continued)

FOREIGN PATENT DOCUMENTS

| | | |
|---|---|---|
| GB | 2544657 A | 5/2017 |
| GB | 2546583 A | 7/2017 |

*Primary Examiner* — Lee D Wilson
(74) *Attorney, Agent, or Firm* — Dinsmore & Shohl LLP

(57) ABSTRACT

An assembly for accomplishing any of drone takeoff/landing, recharging, or package transfer/delivery. The assembly includes a base supporting at least one extendable member. A receiving platform is secured atop the member and a controller interfaces the assembly with the drone for issuing a set of commands for guiding the drone relative to the platform. The command instructions include at least an instruction to elevate/lower the platform at any point for the exchange or landing. Additional command instructions provide for managing each of pre-exchange, during-exchange or post-exchange interactions. The assembly also provides secure retention and post-exchange access by a recipient in the instance of a drone delivered and securely retained package.

20 Claims, 10 Drawing Sheets

Related U.S. Application Data

(60) Provisional application No. 62/540,746, filed on Aug. 3, 2017.

(51) Int. Cl.
*A47G 29/122* (2006.01)
*B66F 3/28* (2006.01)

(56) References Cited

U.S. PATENT DOCUMENTS

| | | |
|---|---|---|
| 9,387,928 B1 | 7/2016 | Gentry et al. |
| 9,527,605 B1 | 12/2016 | Gentry et al. |
| 10,661,916 B2 * | 5/2020 | Janssen ................ A47G 29/141 |
| 2016/0068265 A1 | 3/2016 | Hoareau et al. |
| 2016/0157653 A1 | 6/2016 | Manitta |
| 2016/0207627 A1 | 7/2016 | Hoareau et al. |
| 2016/0221688 A1 | 8/2016 | Moore |
| 2016/0309346 A1 | 10/2016 | Priest |
| 2017/0039510 A1 | 2/2017 | Ogilvie et al. |
| 2017/0090484 A1 | 3/2017 | Obaidi |
| 2018/0016007 A1 | 1/2018 | Sawhney et al. |
| 2018/0049575 A1 | 2/2018 | Yamrick |
| 2018/0086561 A1 | 3/2018 | Stubbs et al. |
| 2019/0039751 A1 * | 2/2019 | Janssen ............. G06Q 10/0832 |
| 2020/0255163 A1 * | 8/2020 | Janssen ................ A47G 29/124 |

* cited by examiner

FIG. 10A
Pre-interchange

- 108: Identify / plan upcoming exchange
  - Drone #
  - Landing port #
- 110: Activate system
  - Sensor(s) recording
  - Determine package management approach
- 112: Approaching drone
  - Raise platform
  - If permanent receiving box, open and prepare
- 114: Confirm interchange go ahead
  - Validate drone
  - Site prepared

FIG. 10B
Pickup (delivery) process.

- 116: Drone lands on platform with package or box (or without for pickup)
- 118: Connection and locking of box or transfer package into permanent container
- 120: Sensors confirm transfer or locking of box
- 122: Drone recharging mechanism engaged if necessary
- 124: Drone releases from container
- 126: Drone prepares for departure and departs
- 128: Platform lowered to normal height
- 130: Complete transfer transaction

FIG. 10C
Post interchange

- 132: Customer notified of receipt of package and provided access information
- 134: Customer accesses / retrieves package
- 136: Visual image of performance
- 138: Session to session comparison

SYSTEM, METHOD AND SOFTWARE BASED MEDIUM FOR PROVIDING A SAFE AND SECURE DELIVERY PLATFORM FOR A DRONE INCLUDING REAL TIME DATA COMMUNICATION INCORPORATING ANY OF VIDEO, RFID AND PROCESS STEP NOTIFICATION

CROSS REFERENCE TO RELATED APPLICATIONS

The present application is a continuation of U.S. Ser. No. 16/053,335 filed Aug. 2, 2018. The '335 application claims priority of U.S. Ser. No. 62/540,746 filed Aug. 3, 2017.

FIELD OF THE INVENTION

The present invention relates generally to security applications associated with delivery drones. More particularly, the present invention discloses a variety of secure delivery and pickup options associated with a package delivery and pickup drone, such as in particular including any of above ground, ground level or below ground containment structures. Additional aspects of the present invention include real time communication for announcing when a delivery has been made, along with any of video, RFID, NFC, etc., and process step notification and confirmation options. Additional aspects include the provision of elevating and lowering (telescoping) platforms for receiving and supporting the drone, such as during either of package pickup/delivery or for supporting a drone at an intermediate flight location in order to recharge the same and/or to provide temporary shelter during inclement environmental conditions, as well as operational or mechanical issues relating thereto.

BACKGROUND OF THE INVENTION

Drone delivery technology has grown significantly in recent years. Examples of these include the Gentry U.S. Pat. Nos. 9,527,605 and 9,387,928 (Amazon Technologies) for Multi-Use Unmanned Aerial Vehicle (UAV) Docking Stations. In each instance, the docking stations can be networked with a central control and a plurality of UAVs. The docking stations can include a number of services to facilitate both UAV guidance and maintenance and community acceptance and benefits. The docking stations can include package handling facilities and can act as a final destination or as a delivery hub. The docking stations can extend the range of UAVs by providing recharging/refueling stations for the UAVs. The docking stations can also include navigational aid to guide the UAVs to the docking stations and to provide routing information from the central control. The docking stations can be incorporated into existing structures such as cell towers, light and power poles and buildings. The docking stations can also comprise standalone structures to provide additional services to underserved areas.

Other examples include the package transport container and transport operations for a UAV as depicted in US 2016/0207627 and US 2016/0068265, both to Hoareau (IBM Corp.). According to the '265 publication, an unmanned aerial vehicle (UAV) is provided that is capable of flying between a pick up point and a delivery point with respect to a package transfer operation. The delivery point is identifiable by the UAV through global positioning system (GPS) coordinates of the delivery point and verification of a device identifier of a package docking device (PDD) associated with a package transfer request.

A control processor coupled to the UAV receives a transaction packet for the operation that includes the GPS coordinates and the device identifier of the PDD associated with the request. Upon arrival of the UAV at the delivery point, the control processor verifies that a device identifier of a PDD located at the delivery point matches the device identifier in the transaction packet, implements the package transfer operation and transmits confirmation of completion of the operation to an originator of the request.

The '627 publication further teaches a package transport container for a UAV which includes a manifest device having a computer processor, a receptacle including a base that secures contents of the receptacle, a locking mechanism that couples the manifest device to the receptacle during transport and a connector coupling the manifest device to the UAV. The processor transmits material properties of the contents of the receptacle to the UAV, receives routing information for a package to be transported, monitors coordinates of the package transport container during transport and upon determining the coordinates match coordinates of a delivery location specified in the routing information: sends a release request signal to the UAV to release the receptacle; receives a release command from the UAV; and disengages the locking mechanism to release the manifest device from the base. The routing information is determined at least in part based on the material properties of the contents.

While the technology for drone delivery has advanced significantly in recent years, an ongoing challenge focuses on the security aspects of drone package delivery (and pickup), most notably as it relates to residential and rural delivery of packages in which the unsecure nature of the delivery environment may not make drone delivery otherwise practical (e.g., homeowner away at the time of delivery). The challenge is in providing an efficient and cost effective solution for securely receiving and holding drone delivered packages for later retrieval. Given further the safety considerations associated with many current drone designs (such having multiple high speed rotating blades), it is sensible to provide a safe delivery environment even in instances in which the recipient is nearby and the present inventions seek to address those concerns.

Manitta, US 2016/0157653 teaches an unmanned delivery vehicle which can secure atop a pole, the latter being hollow for permitting slide-down of mail or parcels. Priest, US 2016/0309346 teaches a UAV which can interface with a delivery location associated with a top of a cellular phone tower (see FIGS. 10-12). The UAV in this variant includes robotic arms for delivery of components (payload 602) associated with tower maintenance.

Other references include UK 2544657 which teaches another type of secured container system for unattended deliveries. US 2018/0049575 (Yamrick) teaches another type of extensible platform for displacing out of an opening (window 8). The holding area can be environmentally controlled and the disclosure includes a smartphone communication protocol for announcing package delivery.

US 2017/0039510 (Ogilvie) teaches another drone delivery method for permitting secure and unattended delivery of parcels. Finally, a further advanced example of a processor/software delivery module for requesting UAV package delivery and authentification is provided in Obaidi, US 2017/0090484.

SUMMARY OF THE PRESENT INVENTION

The present invention teaches a number of above and below grade options for holding and securing a drone delivery package for (later) retrieval by a recipient or for securing an unattended package for pickup by a drone device. In one variant, a platform or combination platform and receiving enclosure/container is provided, such as which can be mounted atop a telescoping pole or other elevate-able support, either fixed or portable. The platform can incorporate any type of landing contact points, such also including but not limited to alignment sensors, which interface with landing portions of the drone, such in combination with locking features (not limited to solenoid portions) for engaging and securing the drone to the platform. In the further instance of the container or other enclosure, the same can include a securable/lockable lid or other retractable top for receiving the drone and/or a package carried thereunder. With further reference to the succeeding description, the landing contact points can be electrically magnetized to assist in the drone landing and retention/securing process/protocols. In one non-limiting variant, the platform supported alignment sensors and charging dimples can be combined into the same components.

A further variant contemplates providing a network of multiple fixed or elevatable platforms at locations between start and end points of a drone flight path as part of a drone support infrastructure dedicated to a given customer territory or area. The platforms can each incorporate recharge capabilities (such also envisioned as an option for any package receiving platform or container associated with a customer) for the purpose of recharging an electric battery powered variant of drone.

Variants of the invention also include instances in which the drone is not in the process of delivering or acquiring a package, such as in the instance of the drone having to land due to weather or mechanical related issues or having to recharge its battery. Such recharge platforms would include communication and directional functionality for guiding the flight path of the drone and, upon the drone landing upon the platform, to interface with magnetic adhering contact points (also charging dimples or the like) with locations of the drone for quickly recharging its batteries, or again related to any weather, mechanical, or other issues. As also described herein, the platform assembly contemplates any type of plug-in charging capabilities in addition to wireless or connectionless (also inductive) charging.

The present inventions further contemplate additional storage and holding options which can include grade (ground supported) or below grade (buried container with an openable surface trap door and which can be mounted on a platform such as a deck). Commercial or industrial applications can further include multi-compartment secure delivery options for the receiving container, such as associated with a common delivery area in an industrial park or other multi-tenant setting.

Other aspects include a reusable transfer box which can be carried by the drone and deposited with such as the elevated delivery platform (such as in use with or in lieu of a permanent receptacle). This can further include lock and unlock or release structure established with the drone carried and reusable container which interfaces with inter-engaging portions configured with the receiving platform for ensuring both secure delivery as well as for use with drone based returns.

A real-time data communication system and protocol is also provided for notifying a recipient of a package delivery event. This can include any of video, RFID, NFC, or other process step notification and confirmation occurring between the drone and the delivery platform to confirm an end-to-end process (i.e., from drone flight initiation to parcel pickup by an intended recipient). In this fashion, the drone delivery and pickup management system manages and coordinates the delivery scheduling, platform control, drone-platform interface, user interaction, etc. by recording, tracking, notifying, etc. the step by step process and protocols associated with the associated control system. The control system can further be customized or modified for application to any specific type of delivery or receiving structures, or protocols.

BRIEF DESCRIPTION OF THE DRAWINGS

Reference will now be made to the attached drawings, when read in combination with the following detailed description, wherein like reference numerals refer to like parts throughout the several views and in which:

FIGS. 7 and 8 are a pair of upper end perspectives of a combination platform and enclosure having a dome shape according to a further preferred embodiment, the enclosure illustrated closed in FIG. 7 and, upon a pair of upper hinged portions being rotated downwardly/outwardly via a proximate electric motor drive, being opened in FIG. 8 for either receiving a package or for revealing a previously placed package for pickup and return, the enclosure further including any range or combination of secondary features not limited to interior lighting, secure locking/unlocking, weight scale, video recording, charging and cooling/heating aspects such as for maintaining the integrity of the contents of a specific package, including such as transported edibles, medicaments and the like;

FIGS. 10A-10C illustrate a series of informational steps for each of pre-interchange, pickup/delivery and post interchange steps associated with the platform and assembly of the present invention;

DETAILED DESCRIPTION OF THE PREFERRED EMBODIMENTS

Figure 1:
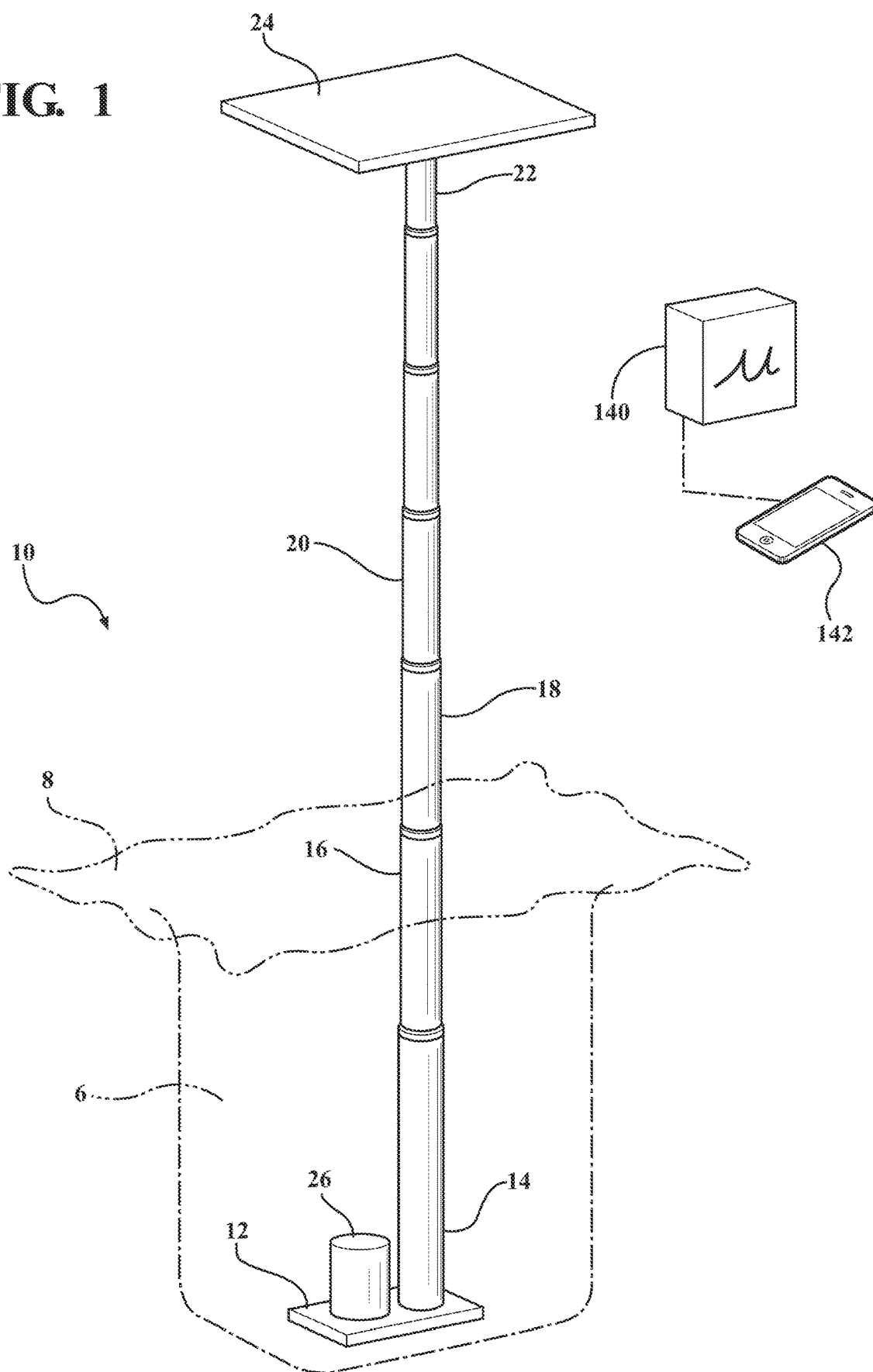
FIG. 1 is a perspective view of one non-limiting variant of a vertically elevate-able platform and telescoping assembly in a fully upward extended position for receiving and supporting a drone device.

As will be described in more detail and with reference to the attached illustrations, the present invention discloses a system, method and control platform/software based medium for providing a number of above and below grade options for holding and securing a drone delivery package for (later) retrieval by a recipient and package pickup by a drone device. The invention provides a secure delivery and pickup platform to which a delivery drone can interface or attach during delivery of a package, such in a preferred embodiment occurring at an elevated location in order to avoid interference with people, traffic and the like.

As will also be disclosed, the present invention also include real-time communication protocols (video, RFID (radio frequency identification), NFC (near field communication), process step confirmation and/or notification and the like) and sensor(s) mechanism integration (weight, access opening/closing, locking/unlocking) occurring between the drone and delivery platform to confirm end-to-end process from drone flight initiation to parcel pickup by an intended recipient. Additional variants include each of secure package transfer and storage (until package retrieval by the recipient), multi-box or multi-compartment platforms for mailbox groups and the like.

By way of further explanation, the present invention assumes the known art to include the availability of standardized package delivery drones which are capable of delivering a package under a given weight and within a specified delivery radius. The platform supporting and package receiving assembly and associated control functionality of the present invention is intended to augment and supplement known drone delivery capabilities in order to provide personalized delivery or return options for a given package recipient (such as a homeowner, small or medium business owner, or other individual/entity) who would benefit from the ability to accept a drone delivered (or provide for a drone pickup) package occurring in their absence.

The related variant of providing multiple drone support/recharge platforms at geographically distributed locations, such as which can be controlled or subsidized by the drone operator or other controlling entity, can provide the further option of leveraging and extending the operational radius of a delivery drone of known capabilities beyond a single electrical charge (such as provided by the on-board Li ion or other battery source within the drone which operates its rotors). Related variants, as will be described, include the need to provide a secure landing for other operational or mechanical related drone issues or situations (e.g., weather, mechanically impaired drone, staging for next pickup/delivery).

The provision of multiple platforms in a networked arrangement, such as which can also be integrated into a single control system in order to direct/redirect multiple package carrying drones (without limitation according to an automated version of an air controller system) between any of a start location (package vendor), end location (customer), and any number of intermediate and temporary supporting and recharge locations, enables the current drone delivery technology in existence to be leveraged to an extent necessary in order to provide realistic delivery capabilities to a wider geographical swath of customers than simply those living in more condensed/urban areas and within a limited geographical distance from a package fulfillment center or other entity controlling the drone delivery service. Beyond providing for iterative drone recharging, the grid or other geographically distributed support platforms may also provide for temporary shelter of a drone in transit, such as in the instance of inclement weather conditions (heavy rain, wind or the like or in instances in which the drone is experiencing operational or mechanical issues).

In this manner, the platform support assembly (individual to a given customer or integrated into a networked/plural platform system in the instance of a geographical delivery grid arrangement over a given delivery area) extends and leverages the effective capabilities of existing drone technology beyond that heretofore known, such as advertised in the prior art of delivering a single relatively light package by a drone within a fairly limited radius and to a fairly limited location. Accordingly, an objective of the receiving platform and control assembly of the present invention is to render practicable the ability to receive and secure a package up to the size and weight carrying capability of the known delivery drone (often in the absence of the recipient during delivery). A further object of the assembly is to also provide for package pickup and return by the drone utilizing the platform assembly.

Figure 9:
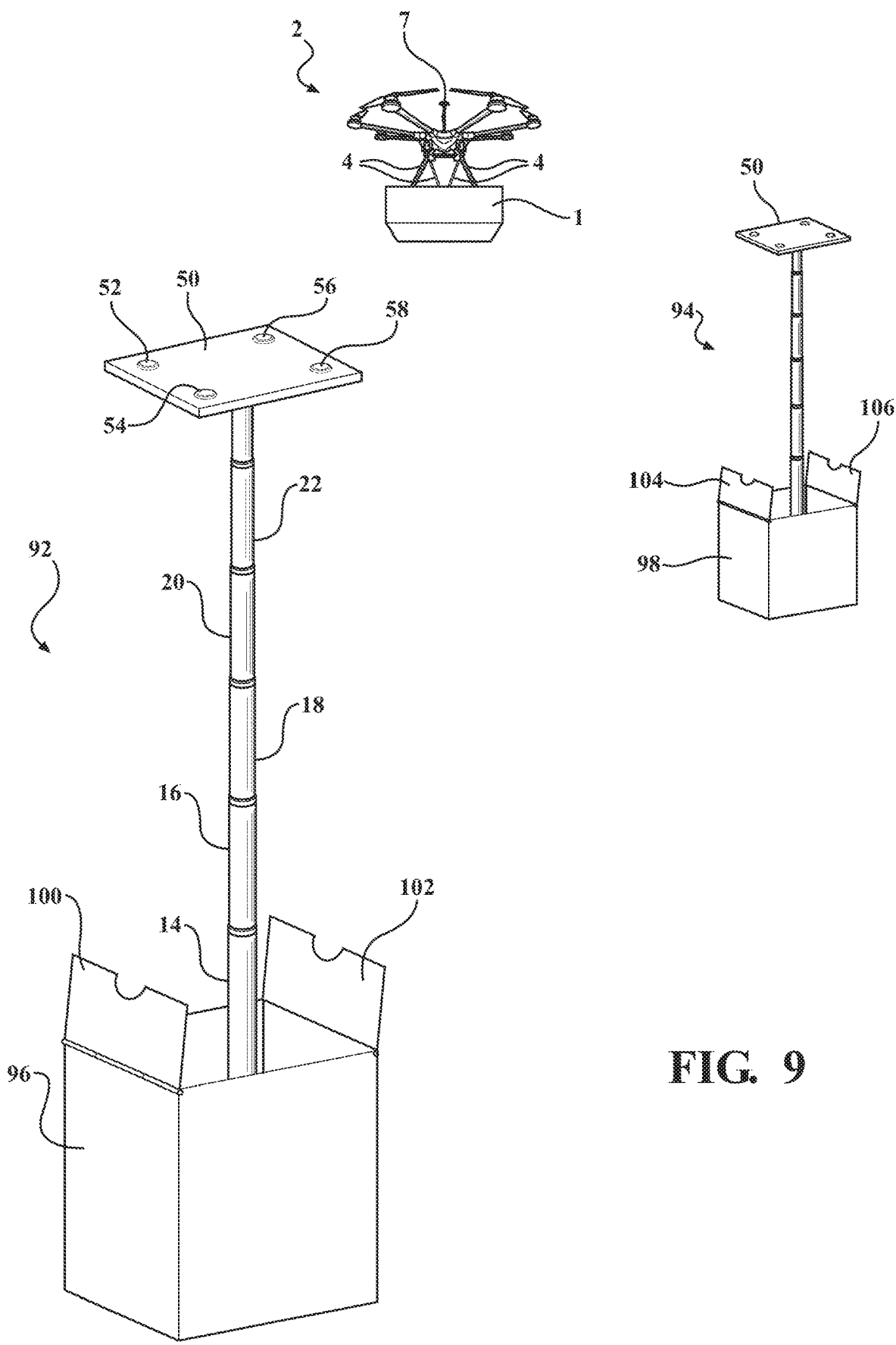
FIG. 9 is an environmental perspective of a related variant of the present invention in which a pair of drone supporting platform assemblies are provided in combination with a drone and which are intended to depict a network of multiple fixed or elevatable platforms at locations between start and end points of a drone flight path, the platforms each incorporating recharge capabilities (such also envisioned as an option for any package receiving platform or container associated with a customer) for the purpose of recharging an electric battery powered variant of drone, such recharge platforms also including communication and directional functionality for guiding the flight path of the drone and, upon the drone landing upon the platform, interfacing charging dimples or other recharge locations integrated into the platform with contact locations of the drone for quickly recharging its batteries.

Referring now to FIG. 1, a perspective view is generally shown at 10 of one non-limiting variant of a vertically elevate-able platform and telescoping assembly in a fully upward extended position for receiving and supporting a drone device (see at 2 in FIG. 9). As previously described, the features and functionality of the drone 2 are assumed to be those of the current disclosed art and which include a battery powered electric motor driven craft having any number of rotors and on-board control functionality (including the ability to receive and send signals for the purpose of changing any one or more of the speed, direction and angle of approach of the drone) and for being directed between start and end points in order to deliver a package up to the weight capability of the drone and to a distance/radius not more than half the effective operational range of the drone as dictated by its electrical charge.

The drone 2 in FIG. 9 can include any engagement and release mechanism for transporting and delivering a package (shown at 1 in phantom), the drone 2 understood to be such as can be provided according to the acknowledged existing capabilities of these devices. The drone rotor arrangement is referenced in FIG. 9 without comment, and such as can further exhibit a set of secure landing pedestal supports or feet (referenced in non-limiting fashion by pedestal locations at 4). It is further assumed that the onboard features and control functionality of the drone (see also antenna 7 which can be integrated into its interior control functionality) can further be retrofitted or customized as a feature of the present invention and to accessorize or reprogram the existing drone to enable the pedestal supports or feet 4 of the drone to be aligned with the platform surface of the present assembly in order to communicate a power recharge source embedded within the platform in order to provide for recharging of the drone on board battery, such as via the foot contact locations (such including wiring or other functionality built into the drone which enables quick battery recharge during support upon the platform). Consistent with the present description, reference to landing contact points, alignment sensors, charging dimples, and electro-magnetized connection points are understood to be interchangeable such that the these can be provided as either individual features or combined together in order to provide locational directing, engaged securement and battery recharge (through either contact/ inductive or plug-in charging).

The platform assembly 10 can be arranged at any above grade, surface grade or below grade location. In each of FIGS. 1-4, a base 12 of the platform assembly is depicted embedded within a below grade location depicted by a vertically extending cavity or hole 6 extending downward from an upper lip or surface 8 representing an exterior grade location. This can further include, without limitation, enclosing a grade or below grade supported platform assembly into a decorative brickwork, concrete or other receptacle which would acquire the normal appearance of a mailbox enclosure located at an end of a driveway or other appropriate disclosure.

The platform assembly 10 of non-limiting representation is shown as including a plurality of inter-telescoping portions, including a lower most and largest sleeve portion 14 secured to the base 12 and any plurality of inner coaxial supported telescoping portions 16, 18, 20, et seq., to an upper and inner-most telescoping portion 22, an upper end of which is affixed to an underside location of a platform 24 for receiving the drone and its package. An actuation component, such as including by non-limiting example a compressor style motor 26, can also be integrated into the base 12 of the platform and can utilize any type of fluid (such as pneumatically or hydraulically operated) according to known channeling capabilities for actuation of the coaxial telescoping portions, 14, 16, 18, 20, 22 between a platform extended and above grade location of FIG. 1 (also FIG. 3) and a retracted and at or below grade location of FIG. 2 (also FIG. 4). Without limitation, the motor 26 can be powered by any direct electrical, battery, solar or other input power source.

Figure 12:
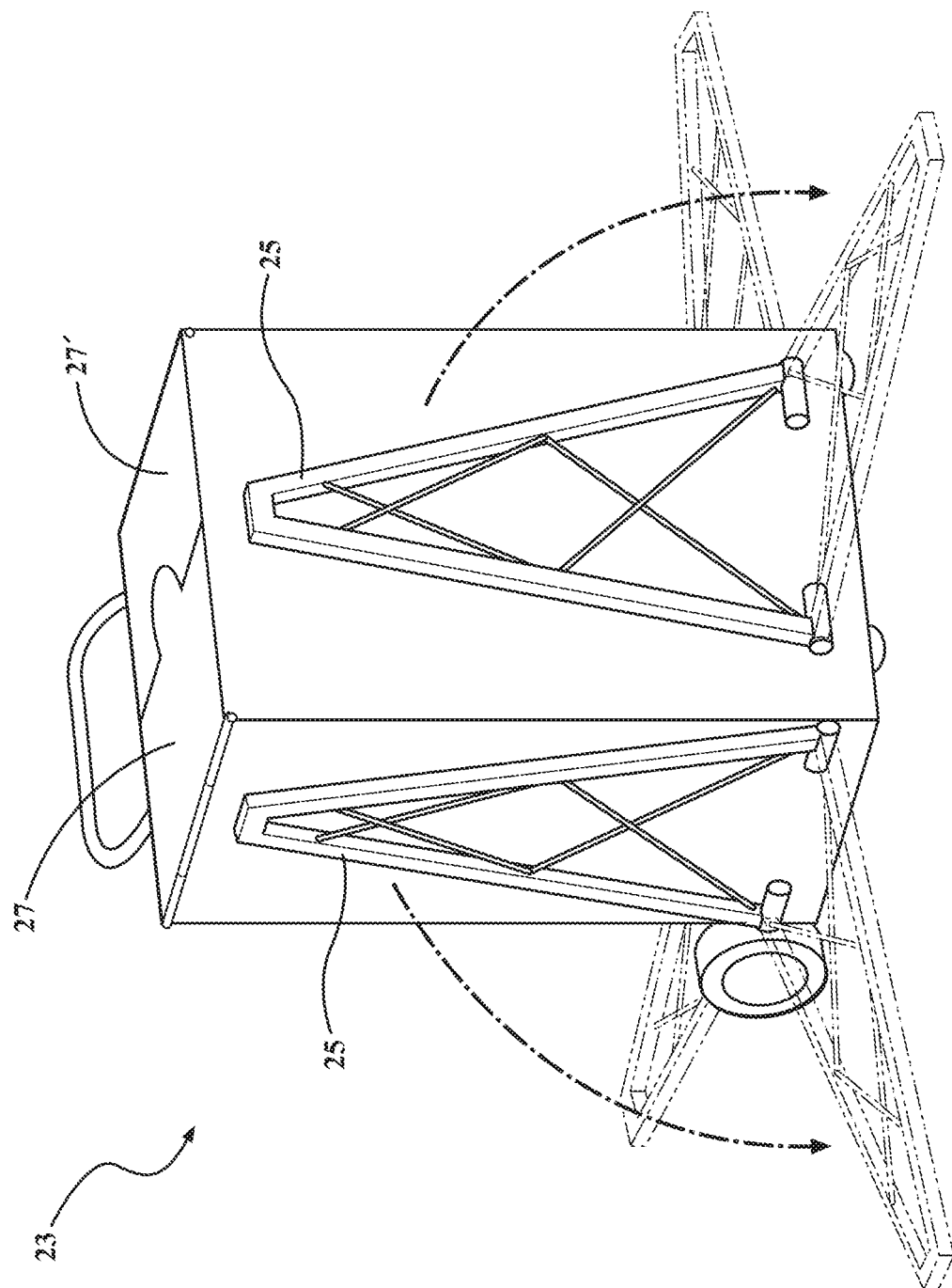
FIG. 12 is an illustration of a portable version of a package receipt platform assembly according to a further embodiment.

It is also noted that, while shown in a fixture mounted fashion below grade, it is further envisioned that the platform assembly and its supporting base can be integrated into a wheeled or other portable trolley (see as shown at 23 in FIG. 12), such as which can further include outwardly pivotal ground supports, further depicted by outwardly pivoting engagement pedestals of which two are visible at 25. Upon positioning such a mobile and elevate-able platform assembly at a desired outdoor location, the pedestals are pivoted outwardly/downwardly to ground support locations for rendering the assembly fixed and for permitting the platform (shown hidden inside of the enclosure 23 via lid portions 27/27') to subsequently be elevated upon opening of the lid portions, and without fear of tipping over the body and integrated base of the platform assembly. In such an alternate application, the base cabinet of a portable trolley can alternatively be sufficiently weighted to ballast the platform once raised and such that the platform assembly can be reconfigured from a permanent fixture installation in FIGS. 1-4 to a portable installation (such as which can be wheeled into or out of a garage or other enclosure during periods of non-use).

The telescoping aspect of the platform assembly can also integrate other known technologies not limited to any type of electro-mechanical winching or other geared winding configurations which enable any one or more vertically extending spars or supports to be displaced between ground/ grade and elevated positions. Aspects of the present invention combine the provision of a platform assembly which is geared for use by retail or commercial consumers with the option of a fixture mounted or portable assembly which permits the user additional options for setting up or storing during periods of non-use.

Additional mounting applications for the platform assembly also envision securing to any of a house deck, rooftop or other fixture supporting location. The platform assembly, with telescoping portions 14, 16, 18, et seq., can also be configured so that it is continually in a normally (continuously) extended configuration and would only retract following receipt of a package delivery (or transfer of a previously placed package within the box or container at the elevated location). The present invention contemplates the timing of extension/retraction of the platform assembly to not be limited to any specific one of the protocols described herein and which can be elevated and subsequently retracted at any time before and following package delivery/transfer.

Figure 2:
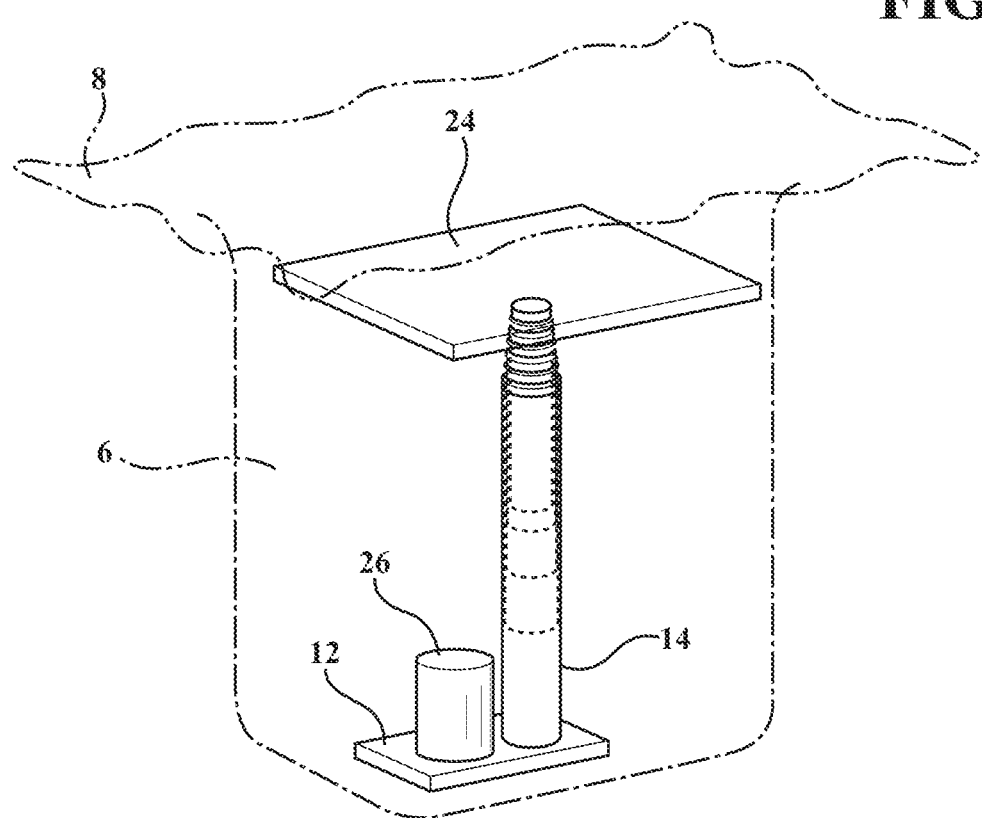
FIG. 2 is an illustration of the platform and assembly of FIG. 1 in a fully retracted and partially below grade location.

Referring to FIG. 2, an illustration of the platform and assembly of FIG. 1 in a fully retracted and partially below grade location and by which the platform 24 is repositioned at or slightly below grade 8 following receipt of a package or during times of non-use. Although not shown, the platform 24 can support a delivered package or, as will be described with further reference to FIGS. 3-4, the platform can incorporate an openable/closable/securable three dimensional enclosure for securing a package delivery, such as in instances in which the recipient is not present.

Figure 3:
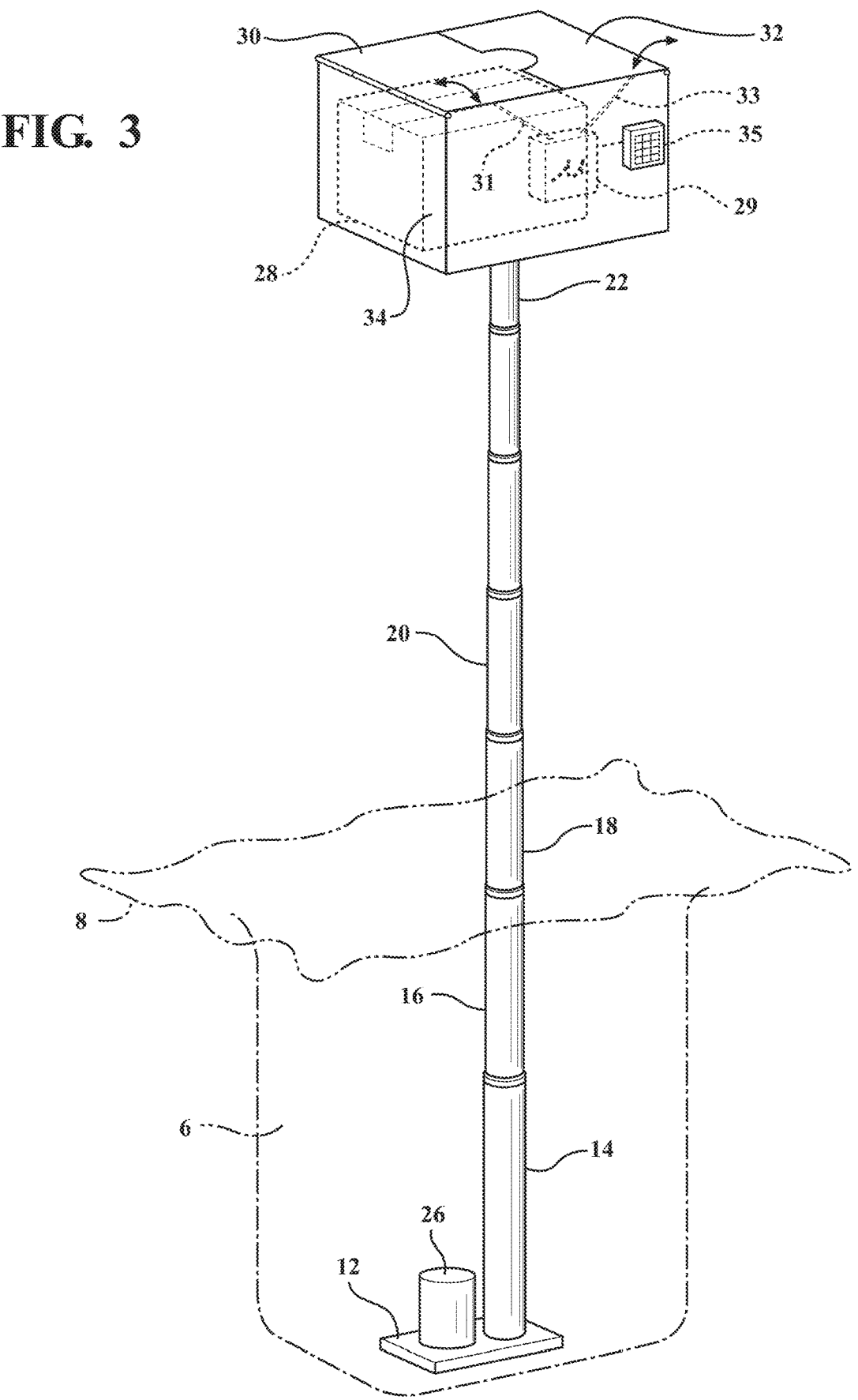
FIG. 3 is an illustration similar to FIG. 1 of a variant of the assembly in which the receiving platform incorporates a three dimensional and openable/reclose-able structure for secure receiving and holding a package delivered from the drone.

FIG. 3 is an illustration similar to FIG. 1 of a variant of the assembly (the common features of which are repetitively numbered) and in which a modification of the receiving platform, see at 28, incorporates a three dimensional and openable/reclose-able/securable structure for receiving and holding a package delivered from the drone 2. The combination platform and integrated three dimensional container can include any number of configurations and, in the instance of FIGS. 3-4, is a generally three dimensional rectangular shape with a base and a lid (further depicted by upper edge supported hinged portions 30/32.

Additional structure is incorporated for opening and closing the hinged portions 30/32, this in order to reveal an open interior of the combination platform and container 28, and which can include a powered mechanism integrated into a side interior location of the upper end mounted container 28, such as which operates linkages or gearing of any known configuration for responding to a command of a controller or the like (see phantom representation of a combination interior controller and actuating component 29 in FIG. 3 which can be located to an interior side position of the container interior to maximize receiving space for the package). The controller/actuating component 29 can respond to a command sequence (such as issued by the approaching drone) to pivot open the lid portions 30/32, in one non-limiting example by telescoping linkages 31 and 33 extending from the interior control housing 29 to each of the lids for flipping open the lid portions 30 and 32, to receive the package (see in phantom at 34) delivered from the drone 2, and to reclose the lids in a subsequent command sequence following delivery to securely hold the package. As further shown in FIG. 3, the linkage mechanisms 31/33 can be gear or other otherwise actuated and can both pivot and extend relative to mounting securable locations to the interior component 29 to open and reclose the container 28 in response to a delivery signal provided from the drone 2. In this fashion, the platform and box are in communication with the drone and the associated control system (see as further identified at 140 and as described with reference to FIGS. 10-11) for timing and step by step monitoring of the package transfer process.

Figure 4:
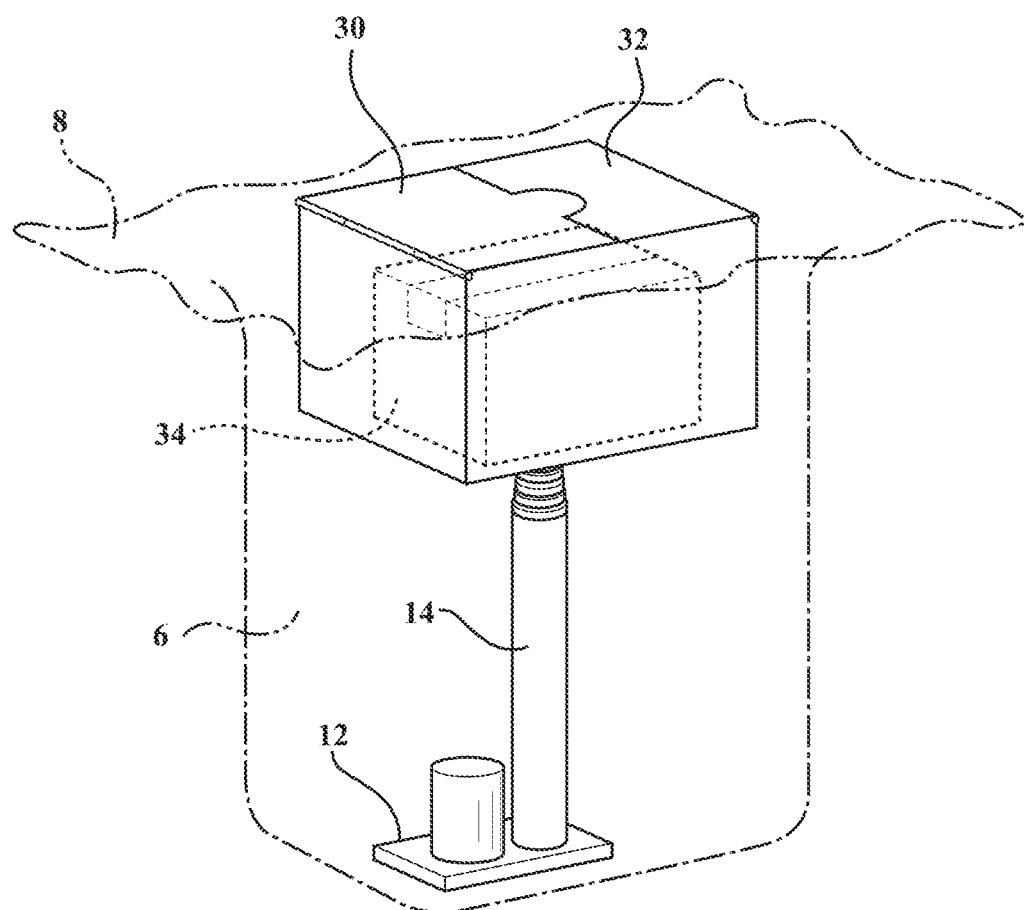
FIG. 4 is an illustration of the platform and assembly of FIG. 3 in a fully retracted and partially below grade location.

Once delivered, the telescoping support and upper end mounted container is lowered as shown in FIG. 4 in a fully retracted and (optionally) partially below grade location prior to accessing by the recipient. The present invention also contemplates the telescoping assembly being left in an upward extended condition for extended periods of time prior to package receipt (or package pickup) and only retracted downwardly following a drone package delivery or transfer having occurred.

Without limitation, reopening of the container by the recipient can be accomplished by any of activating a remote command signal built into such as a smartphone app communicated with the controller aspects of the platform assembly or the use of key or electronic keypad (see at 35 which can be connected to the controller/actuating component 29) with a code or a control system code delivered or otherwise provided to the user, this for accessing a lock such as at a conjoining location of the lid portions for allowing them to open/reclose.

Figure 5:
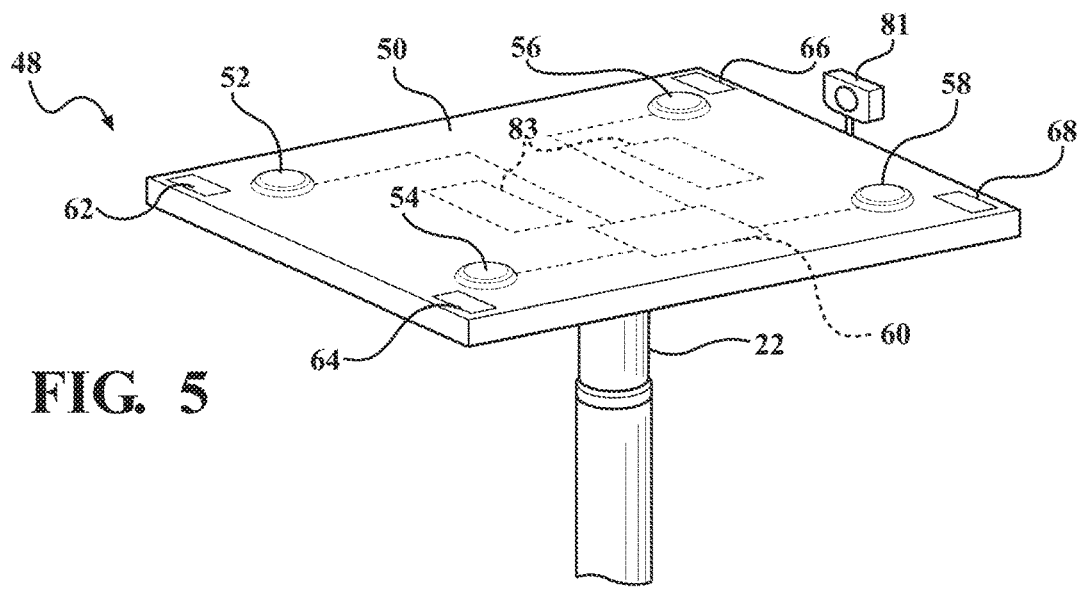
FIG. 5 is an upper end perspective of a variant of drone and package supporting platform incorporated into the present assembly in which a plurality of drone aligning and charging dimple locations (such also including pressure actuated dimples integrated together into landing contact points and which can further include either or both directional sensor and magnetic securing aspects) and which are configured at distributed locations along the upper surface of the platform and which, upon being contacted by foot support locations of the drone, engage a charge source integrated into the platform for recharging of the drone's portable power supply which can further include such as a lithium ion or other rechargeable battery.
Figure 6:
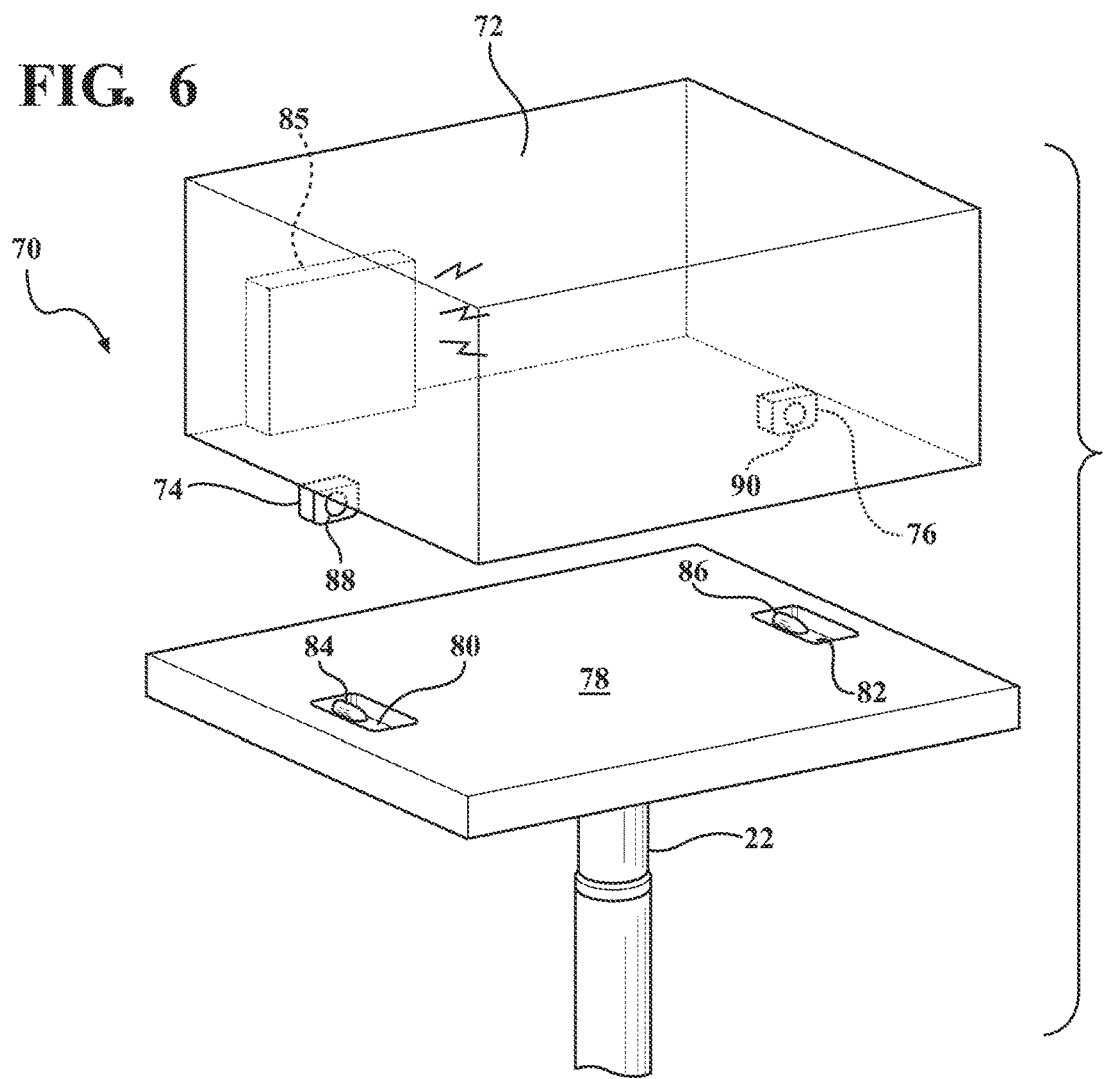
FIG. 6 is an exploded view of a further non-limiting version of a drone receiving platform in which a delivery container can include such as underside tabs which, upon aligning the delivery drone and container with the platform surface by any combination of sensors or other locating futures, causing the tabs to seat within recess locations formed within the upper surface of the platform, solenoids within the platform being actuated to engage through apertures in the tabs to lock the container to the platform.

Consistent with the above description, the enclosure of FIG. 3 can include additional and non-limiting features included with the platform of FIGS. 5-6, and not limited to any of locating and attachment of the drone, again by separately providing or combining together any of landing contact points, alignment sensors, mechanical fastening locations, contact or plug-in charging capabilities. Other additional features can include any one or more of interior cameras, weighing scales, and environmental controls for handling of edibles or medicaments including such as heating and cooling subsystems incorporated into the package retaining enclosure.

Figure 7:
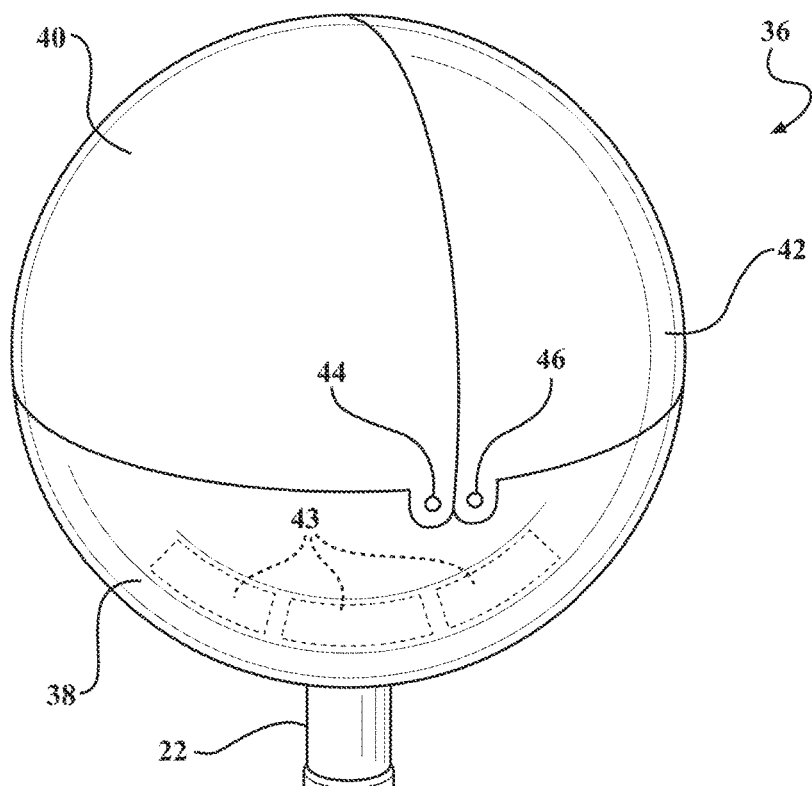
Figure 8:
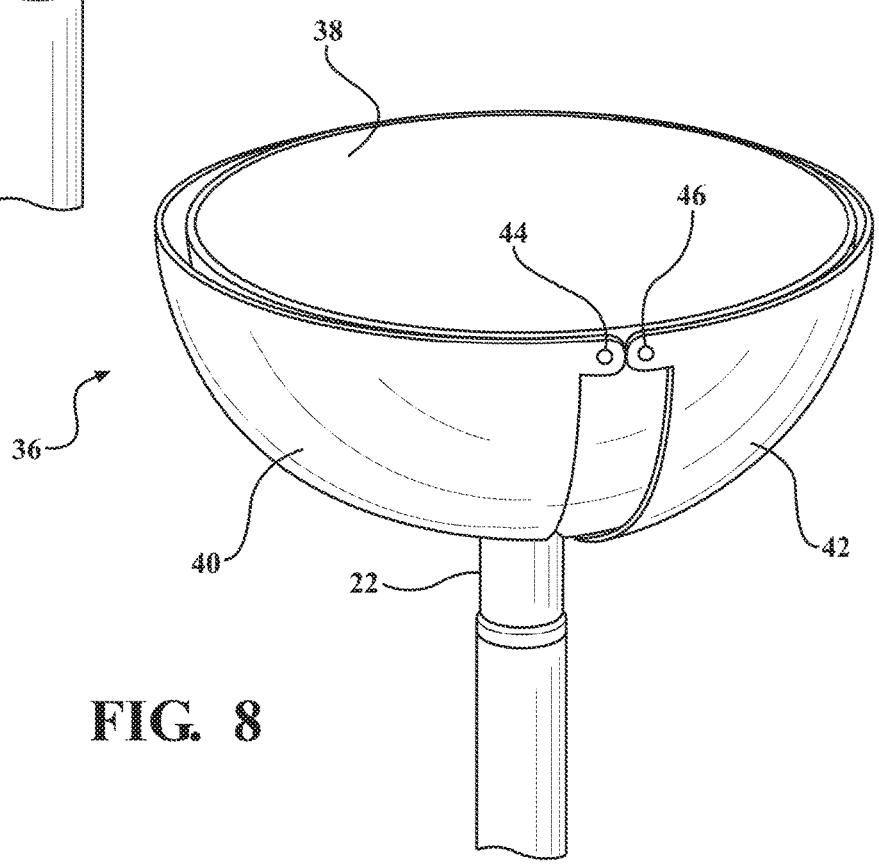

FIGS. 7 and 8 depict a pair of upper end perspectives of an exemplary combination platform and enclosure having a dome shape according to a further preferred embodiment, generally at 36. The enclosure can be functionally and operationally similar to the platform design of FIGS. 5-6 and is illustrated in a closed position in FIG. 7 with a semi-spherical base 38 fixed to the uppermost telescoping portion (again at 22). A pair of quarter-spherical upper portions 40 and 42 are further depicted and are hinged at respective locations, see front facing side 44 and 46, associated with front and rear aligning locations of the upper edges of the base 38.

As further shown in FIG. 8, and upon a signal provided such as from the approaching delivery drone or, alternatively, by any other remote controller tracking the GPS movements of the drone and determining that the drone is approaching the drop off or delivery location of the container, the controller and opening component integrated into the platform/enclosure 36 (such as by example as shown in FIG. 3 according to any other redesign) is actuated to open the partial (quarter) spherical lid portions 40/42 to rotating downward to the position depicted in FIG. 8 for receiving the package (not shown in this view). Following receipt of the package, the controller component and associated drive linkages which can be designed to be integrated into the example of FIGS. 7-8 can be actuated in a reclosing configuration in order to lock the package until accessed by the intended recipient. The rotate down structure of FIGS. 7-8 can be substituted by any form of rotate or tab/slot arrangement for opening and closing the container for receiving the package delivery.

Additional considerations include the non-limiting design of FIGS. 7-8 being used in a predominantly (or nominally) elevated position and only being retracted when a person was ready for a package pickup or delivery. Also, the combination platform and enclosure is not limited to the globe configuration shown and can include any other three dimensional arcuate or polygonal shape. In this exemplary application, during normal use, lights (such as further described below at 43) could be built into such as an underside of the elevated enclosure 36 for it to serve nominally as a street or driveway light. In such a variation, the combination lighting element and enclosure could include all of the same features as previously shown and described (e.g., secure closure, locking features, recharging capabilities, weight scale, cameras, interior environmental controls for heating and cooling of package contents). To this end, FIG. 43 depicts a non-limiting example of a plurality of arcuate lights 43 which can be integrated or recess embedded into the base of the spherical shaped enclosure 36 (such as to avoid disruption by the downwardly overlapping and retracting quarter-spherical lid portions 40/42, and which can include the use of LED powered elements or other package space saving technology for providing combined package retention and normal lighting functionality. The use of different lighting technology, as well as the ability to provide a suitable power source for illuminating is known in the art and provides a range of practical functionality to a non-limited version of the platform assembly.

Proceeding to FIG. 5, an upper end perspective is generally depicted at 48 of a variant of a drone and package supporting platform 50 incorporated into the present assembly, and in which a plurality of drone aligning, magnetic attachment and/or charging pressure dimple locations (see further at 52, 54, 56 and 58), which are configured at distributed locations along the upper surface of the platform. In one non-limiting application and, upon being contacted by foot support locations of the drone 2 (again exemplary depicted in FIG. 9), these engage a charge source (see at 60 in phantom) integrated into the platform for recharging of the drone's portable power supply, which can further include such as a lithium ion or other rechargeable battery.

In combination with the charge dimples (such as which can be contact or pressure actuated) the platform assembly can further include an arrangement of positioning sensors (see further at 62, 64, 66 and 68 arranged at corner locations). The sensors 62-68 can include RFID, NFC or other proximity sensors which, upon interfacing with the transmitter of the drone 2 (see again antenna 7 in FIG. 9) can assist the drone's interior control architecture to adjust its position through its various rotor's in order to center the drone for landing upon the platform.

Additional features which can be integrated into the platform and its associated controller components can include integrating any of arrangement of cameras and micro-cameras, weight scales or the like to support the delivery/pickup process in a secure manner. The charging dimples 52-58 can also include or be substituted with magnets or electro-magnets for assisting in drone securement, product transfer and recharging functionalities.

FIG. 6 provides an exploded view of a further non-limiting version of a drone receiving platform, generally at 70, in which a delivery container 72 (such as which can be transported by the drone 2) is provided and includes exemplary secure locking and unlocking mechanisms with underside tabs (see at 74 and 76). The delivery drone, upon reaching the platform upper surface (see at 78) is aligned by any combination of sensors or other locating futures (see again as referenced in FIG. 5), causes the tabs 74/76 to seat within recess locations (at 80 and 82) formed within the upper surface of the platform. Solenoids (see further at 84/86) are integrated within the platform and, upon being actuated, displace in engaging fashion through apertures (at 88 and 90) configured in the tabs to lock the container 72 to the platform 78. As with the other disclosed embodiments, any combination of sensor locating, locking and charging features can be integrated into any version of the package receiving platform, again such being integrated in use with the associated control system.

Referring again to FIG. 9, an environmental perspective is again shown of a related variant of the present invention in which a pair of drone supporting platform assemblies (see at 92 and 94) are provided in combination with the drone 2 and which are intended to depict a network of multiple fixed or elevatable platforms at locations between start and end points of a drone flight path. As described, the platforms each incorporating recharge capabilities (such also envisioned as an option for any package receiving platform or container associated with a customer) for the purpose of recharging an electric battery powered variant of drone, such recharge platforms also including communication and directional functionality for guiding the flight path of the drone and, upon the drone landing upon the platform, interfacing charging dimples or other recharge locations integrated into the platform (pressure contact charge dimples again shown at 52-58) with contact locations of the drone for quickly recharging its batteries. This provides the ability of the control system to interface with the secure locking and unlocking of the platform locating and engaging structure, and can again provide additional functionality not limited to video recording of the package exchange, weighing to support the secure exchange process and by confirming (such as in a pickup protocol) that the weight of the package does not exceed the capabilities of the drone.

Contrasting the recharge stations of FIG. 9 from that depicted in the prior art, each can include a storage container or base enclosure, see at 96 and 98, which can include a secure hinged openable top (see lid pairs 100/102 and 104/106 which can be actuated or controlled in similar fashion as the platform mounted container of FIGS. 3-4). Without limitation, the intermediate recharge platforms can also be fixed structures utilized in combination with the user/recipient platform assemblies.

Consistent with the previous disclosure, the pressure/charge dimples 52-58 of FIG. 5 (as well as potentially the sensors 62-68) can be combined into electro-magnetic components which, upon the drone being aligned in a landing configuration, are activated to magnetically adhere metal portions of such as the drone landing feet to the platform.

Other secondary features are represented in FIG. 5 and include a camera 81 mounted to an edge location of the platform for documenting a package exchange and a pair of weight scale pads 83 which can be built into the structure of the platform for weighing a package deposited thereupon.

Without limitation, the drone delivered shipping box or enclosure 72 of FIG. 6 can also include an interior located and powered environmental control unit 85, such as which can provide for heating or cooling of the package contents held within the enclosure (e.g., edibles, medicaments, etc.). Additional components in FIG. 6 can include the provision of the charge dimples or ports built into the surface of the platform 78 for maintaining contact/inductive or plug in charging of the interior environmental control unit 85. This can also include other charging ports, RFID/NFC or other features which are integrated into the shipping box or container, the platform surface or the like.

FIGS. 10A-10C illustrate a series of informational steps for each of pre-interchange (steps 108-114), pickup/delivery (steps 116-130) and post interchange (steps 132-138) associated with the platform and assembly of the present invention. A separate processor or controller (see as represented at 140 in FIG. 1) can without limitation be integrated into any one or more of the delivery/pickup drone 2, the control architecture of the delivery platform assembly 10, or some remote location. The processor can interface with any portable device (see tablet or smart phone 142) by any communication protocol including wireless, Bluetooth, near field communication or the like in order to carry out the steps of FIGS. 10A-10C which will now be described.

The non-limiting and exemplary pre-exchange command protocols which are depicted being with an identification of the drone and assigned landing location (platform assembly) at step 108. At step 110, the system is activated including the guiding sensors integrated into the platform and for accessing protocols for determining an optimal package management approach. Successive step 112 acknowledges approach of the drone 2, at which time the platform is raised by upwardly telescoping the associated support assembly (see again FIGS. 1-2) and, in the instance of a permanent enclosure structure mounted atop or incorporated into the platform (FIGS. 3-4) for opening the lid and preparing for package delivery (or pre-placed package pickup/return by the drone). Alternatively, the platform can have been previously raised (such as in the instance of its nominal operation as an extended light pole in FIGS. 7-8) and the protocols do not discriminate as to the timing of platform elevation which can occur at any point in time not limited to just prior to a package delivery. Finally, step 114 confirms execution of the interchange, including validating the drone and site preparation at the platform assembly.

The pickup/delivery protocols of steps 116-130 succeeding the pre-interchange steps 108-114 initiates with the drone landing on the platform with the package/box supported thereunder for delivery or not for pickup (step 116). At step, 118, the connection and locking of the outer shipping box (again at 72 in FIG. 6) or transfer of the package (at 34 in FIG. 3) occurs, following which at step 120 the sensors integrated into the platform (again at 62-68 in FIG. 5) confirm transfer or locking of the box. Step 122 proceeds with the drone 2 being recharged if necessary (see for example pressure actuated charging dimples 52-58).

At step 124, the drone 2 is released from the container (and which can include any arrangement of release solenoids associated with the platform for securing the container as in FIG. 6 or directly engaging the drone), following which the drone prepares/departs in step 126. Following package delivery/pickup, at step 128, the platform is retracted/lowered to its nominal height (FIG. 2) with any delivered package being secured upon the platform or within an enclosure defining container integrated into the platform so that, at step 130, the transfer transaction is completed. As with the initial raising or elevation of the platform in step 112, the lowering of the platform in step 128 can occur at any point subsequent to package delivery and not necessarily just after the delivery has occurred. This can include the recipient initiating lowering only once present to receive the package.

Following the exchange protocol, post interchange steps include the customer being notified of the receipt of a package and provided the necessary access information (at step 132). This can include a number of options including those afore-described in which the recipient can manually or automatically open the container (or alternately unlock the engaging solenoids). The access information can also include an access or retrieval code being provided by the associated programing of the control module for the user to guarantee authorized opening of the enclosure and removal of the package contents. Succeeding steps include each of the customer accessing or retrieving the package (step 134), a proximate camera recording the delivery or existence of the package (step 136) and additional control/comparison functionality for providing session to session comparison with other deliveries to ensure such as adherence or compliance to established delivery protocols.

Figure 11:
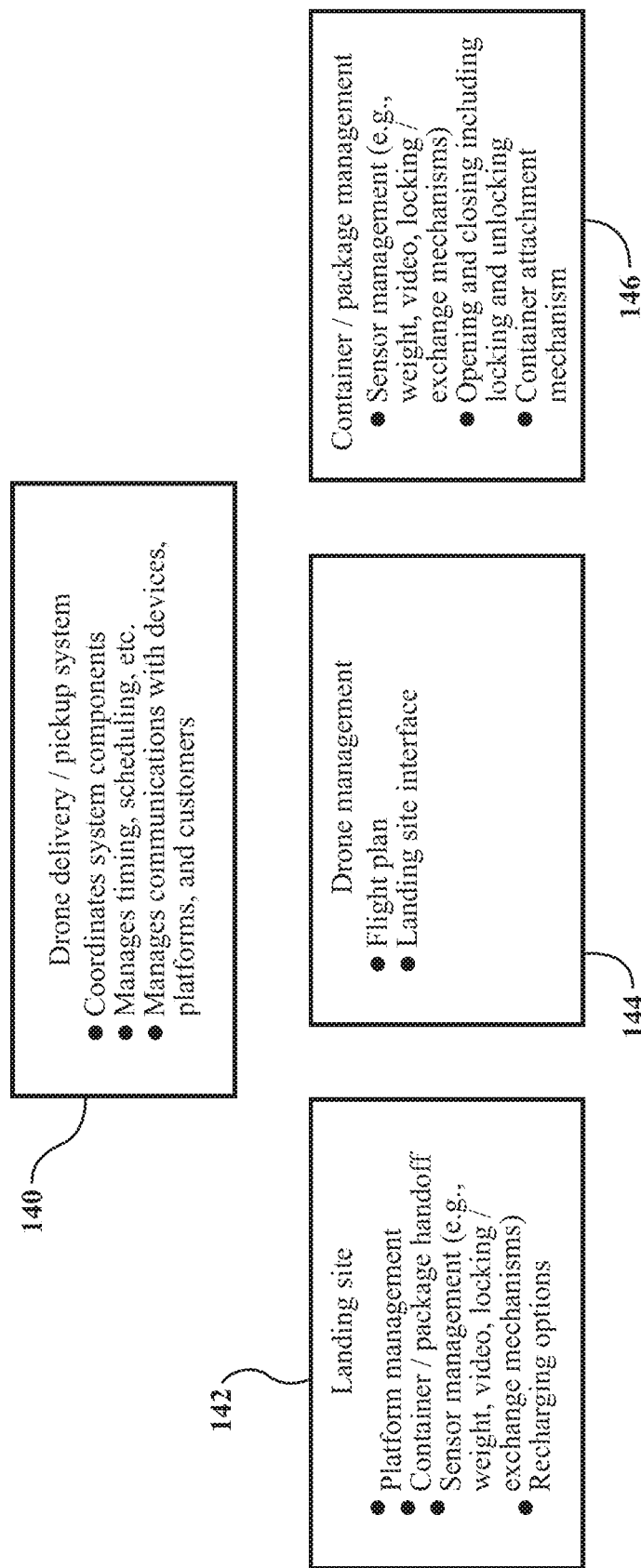
FIG. 11 is an illustration similar to FIG. 10 of a drone delivery service control system for coordinating each of delivery and secure retention of drone delivered packages as well as for providing secure retention of packages for drone pickup and return.

FIG. 11 is an illustration similar to FIG. 10 and providing additional explanation of subset functionality of a drone delivery service control system (drawing from the protocols of FIGS. 10A-10C), such for coordinating each of delivery and secure retention of drone delivered packages as well as for providing secure retention of packages for drone pickup and return in expanded delivery scenarios outside of a single end user delivery protocol. This can include any version of the platform receiving assembly which can incorporate multiple components/subsystems including such as multiple receiving enclosures built into a common platform assembly (such as providing a common mailbox style delivery location for any of an apartment/condominium complex, industrial park or the like).

Referring to FIG. 11, step 140 recites the ability to control the platform to conduct each of coordination of system components, managing timing, schedules, etc., as well as managing communications with any devices, platforms or customers. At step 142, landing site subset functionality includes each of platform management, container/package handoff and sensor management (including again such as determining a package weight, providing video feed, operating locking/exchange mechanisms, and provide for recharging of the (landed) drone or the supported shipping container, such being integrated into the control system architecture interfacing with the platform.

Succeeding step 144 covers drone management functionality (flight plan and landing site interface also covered in the protocols of FIG. 10A). Concluding step 146 recites container/package functionality including each of sensor management (e.g., weight, video, locking/exchange mechanisms), opening and closing of the platform integrated container (this including the locking and unlocking aspects previously described) and its associated container operating mechanism (see again at 29, 31 and 33 in the non-limiting example of FIG. 3).

The protocols of FIGS. 10-11 can include application to any singular or plural receiving locations (fixed or reusable/transportable) and again includes each of coordinated (GPS or like) enable two way communication with the delivery drone prior to landing, landing/engagement, exchange, and release and post delivery verification (such in real time fashion). Other features can include all weather packaging options (for use with thin-coated box or shrink wrapped packages), alternate power sources (including solar) for operating the extensible/retractable mast or pole, and the like.

The range of communication protocols for use with the architecture and control platform of the present invention can include any one or more of vision/video, RFID, Bluetooth, ZigBee, WiFi or other Near Field Communication (NFC) protocols for handling each aspect of approach, engagement, delivery, release and post-delivery verification aspects provided by the associated control platform. It is also envisioned that GPS (global positional system) functionality and protocols can be integrated into the present invention, this including the ability to identify a given platform assembly location and to interface with the command protocols between the drone, the platform and any remote controller in order to guide the drone for package transfer at the desired location.

As previously described, numerous additional options exist for accomplishing secure and real-time notified package delivery in use a reusable container, such as which can be both delivered from and picked up by a drone in use with the receiving container/platform in combination with the locking/exchange structure not limited to that described herein. As previously described, the platform delivery assembly of the present invention can optimize and work with existing drone delivery technology in order to provide secure delivery and retention options, including such as for use by residential and commercial recipients who may not be present to receive a drone delivered package however would want to have the means to do so and to secure the package until present to unlock/open to access the contents thereby preventing theft.

Related applications envisioned for the present invention also include use in rural (lower population density) areas. The present application can be further modified for use as a food service delivery platform (such as in which prepared food, groceries, and the like can be delivered, and in which the associated container for transporting can be appropriately heated or cooled consistent with the type of edible being transported.

The present invention can further be adapted for use in delivery of medications and other medical/pharmaceutical type goods, such including secure, step-by-step transfer/notification protocols which are built into the control system, and again with support for cooling/heating the medicaments if necessary.

Having described my invention, other and additional preferred embodiments will become apparent to those skilled in the art to which it pertains, and without deviating from the scope of the appended claims.

I claim:

1. An assembly for use with a delivery drone, comprising:
   a base supporting at least one vertically extensible member;
   a platform secured atop said extensible member; and
   a controller for guiding the drone relative to said platform and for elevating or lowering said platform.

2. The assembly as described in claim 1, said platform further comprising a three dimensional structure having a receiving interior and a lid, an operating mechanism incorporated into said structure and, upon receiving additional commands from said controller, opening said lid prior to at least one of a package delivery, package pickup, or a package exchange and reclosing said lid following said delivery or exchange.

3. The assembly as described in claim 1, said at least one vertically extensible member further comprising a plurality of actuated telescoping portions, an actuation component in communication with said telescoping portions for elevating and retracting said platform.

4. The assembly as described in claim 1, further comprising said base affixed to any of an above grade, grade or below grade location.

5. The assembly as described in claim 2, said three dimensional structure further comprising individual sub-divided compartments such as associated with a common delivery area in an industrial park or other multi-tenant setting.

6. The assembly as described in claim 1, further comprising lock and unlock/release features incorporated into said platform for receiving and securing either the drone or a reusable transfer container adapted to being carried by the drone and deposited upon said platform.

7. The assembly as described in claim 1, said controller further comprising a data communication protocol including any of RFID, NFC, cellular, Wi-Fi or process and/or confirmation step notification during any of take-off, landing, package delivery or package exchange.

8. The assembly as described in claim 7, further comprising a video feed of said platform communicating with said controller.

9. The assembly as described in claim 7, further comprising a software component incorporated into said controller for providing any of recharging the drone, receiving, releasing or holding a package upon said platform, weighing the package, and issuing confirmation of a package delivery or pickup.

10. A transit support network for use with a drone, comprising:
a plurality of individual sub-assemblies arranged at geographically spaced locations, each including a platform adapted for receiving the drone;
at least one of said sub-assemblies including an elevating/lowering member supporting said platform; and
a controller guiding the drone between start and end locations, including transit to and between one or more of said sub-assemblies, said controller actuating said elevating/lowering member to raise or lower said platform.

11. The network as described in claim 10, further comprising said control system issuing a set of commands for guiding and positioning the drone relative to a selected one of said sub-assemblies corresponding to at least one of take-off, landing, package delivery, package pickup or package exchange.

12. The network as described in claim 11, said controller further comprising a data communication protocol including any of RFID, NFC, cellular, WiFi or process and/or confirmation step notification.

13. The network as described in claim 10, further comprising a software component incorporated into said controller for providing for any one or more of recharging the drone, receiving or holding a package upon said platform, weighing the package, and issuing confirmation of a package delivery or pickup.

14. The network as described in claim 10, said platform further comprising a three dimensional structure having a receiving interior and a lid, an operating mechanism incorporated into said structure and, upon receiving additional commands from said controller, opening said lid prior to at least one of a package delivery or a package exchange and reclosing said lid following said delivery or exchange.

15. The network as described in claim 10, said elevating/lowering member further comprising a plurality of actuated telescoping portions, an actuation component in communication with said telescoping portions for elevating and retracting said platform.

16. The network as described in claim 10, further comprising lock and unlock/release features incorporated into said platform for receiving and securing either the drone or a reusable transfer container adapted to being carried by the drone and deposited upon said platform.

17. A drone operating system, comprising:
a plurality of individual sub-assemblies arranged at geographically spaced locations, each including a platform adapted for receiving the drone;
at least one of said sub-assemblies including an elevating/lowering member supporting said platform;
a controller for guiding the drone between start and end locations, including transit to and between one or more of said sub-assemblies, said controller actuating said elevating/lowering member to raise or lower said platform; and
said controller including process and data communication protocols to accomplish at least one of take-off, landing, recharging the drone, package delivery, package pickup or package exchange.

18. The system as described in claim 17, said data communication protocols further comprising any of RFID, NFC, cellular, Wi-Fi or process and/or confirmation step notification.

19. The system as described in claim 17, said elevating/lowering member further comprising a plurality of actuated telescoping portions, an actuation component in communication with said telescoping portions for elevating and lowering said platform.

20. The system as described in claim 17, further comprising lock and unlock/release features incorporated into said platform for receiving and securing either the drone or a reusable transfer container adapted to being carried by the drone and deposited upon said platform.

* * * * *